May 22, 1945.  F. B. IDEN  2,376,540
MACHINE HEAD-CONTROL MECHANISM
Filed Jan. 14, 1943  3 Sheets-Sheet 2
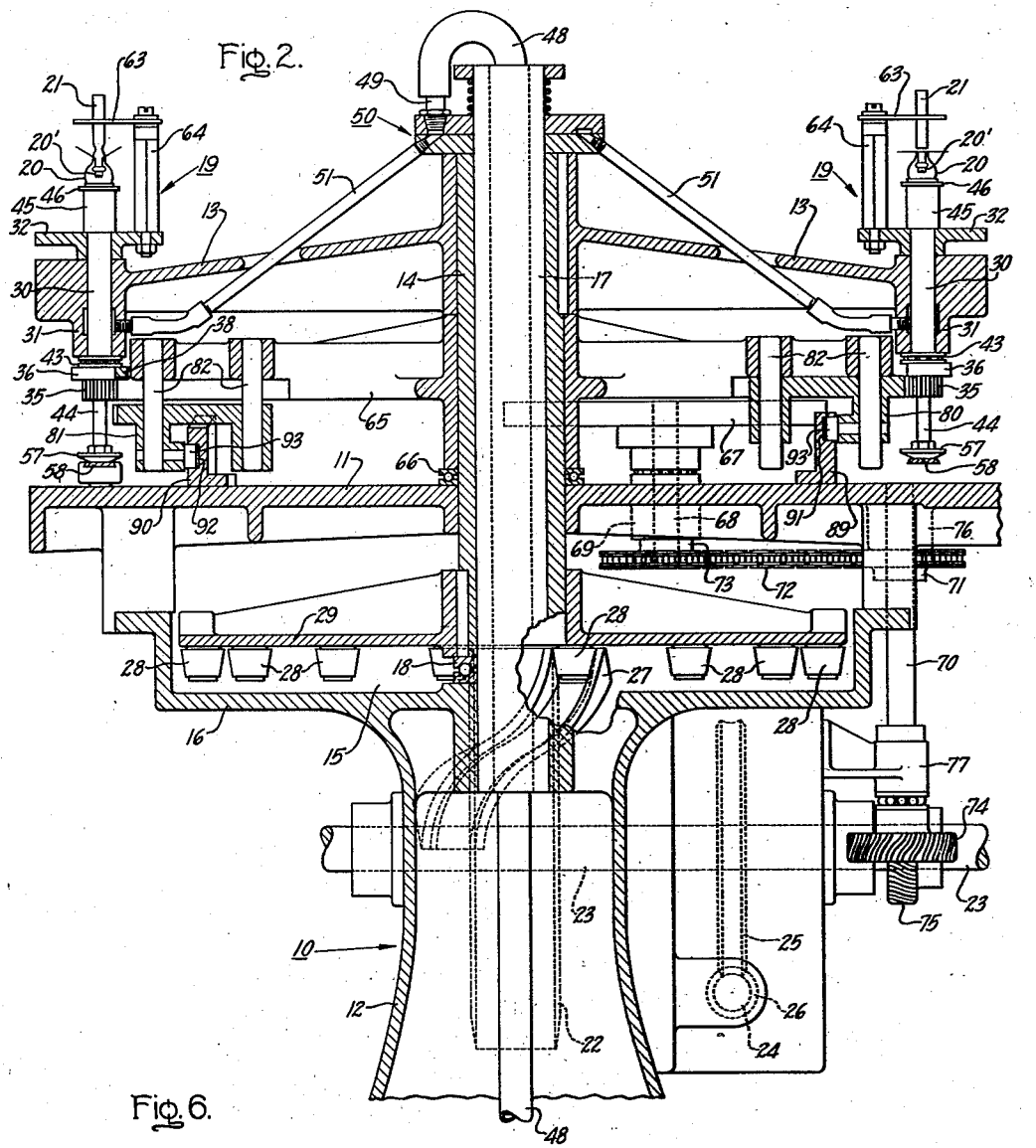
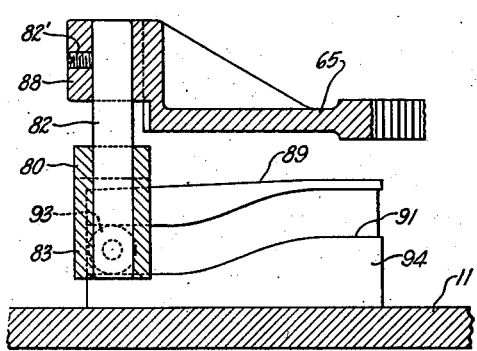
Inventor:
Fred B. Iden,
by John H. Anderson
His Attorney.

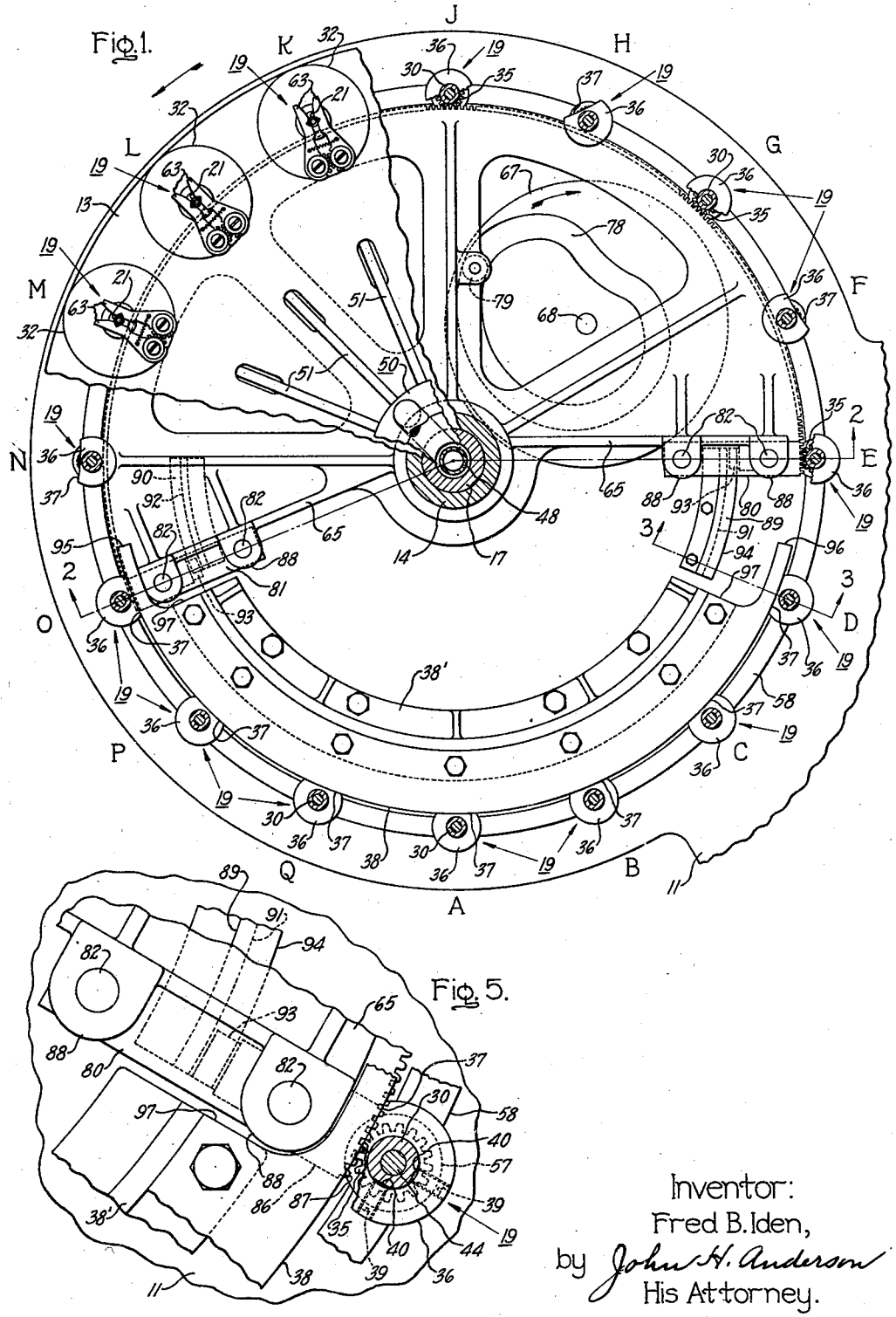

May 22, 1945.　　　　F. B. IDEN　　　　2,376,540
MACHINE HEAD-CONTROL MECHANISM
Filed Jan. 14, 1943　　　　3 Sheets-Sheet 3
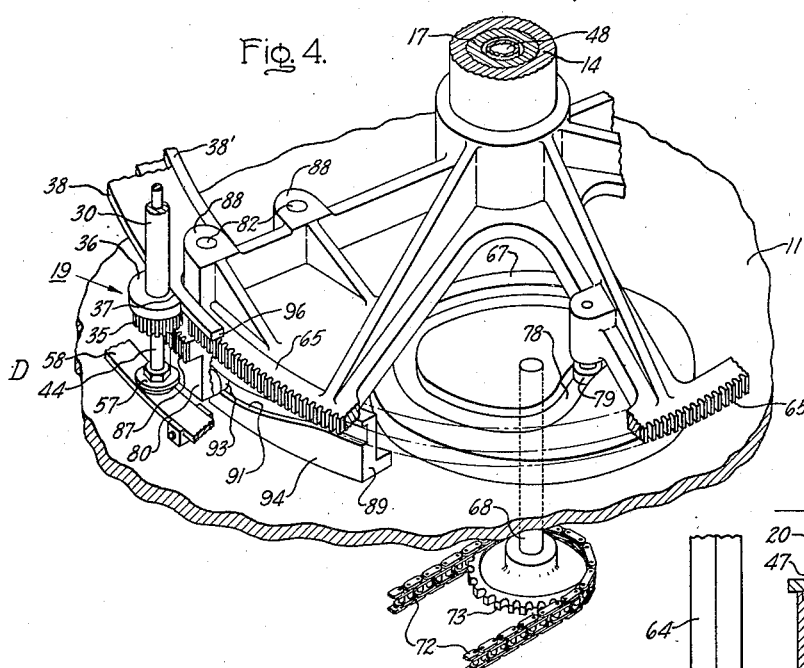
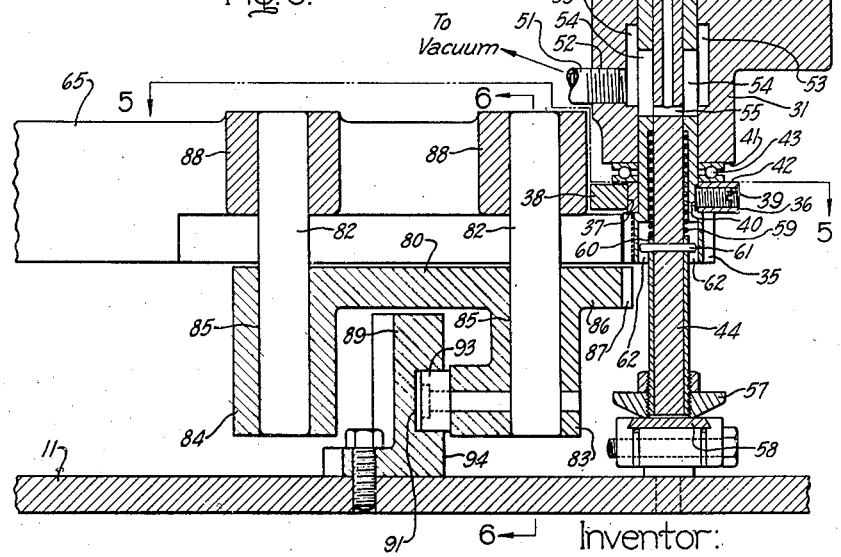
Inventor:
Fred B. Iden,
by John H. Anderson
His Attorney.

Patented May 22, 1945

2,376,540

UNITED STATES PATENT OFFICE 2,376,540

MACHINE HEAD-CONTROL MECHANISM

Fred B. Iden, Cleveland Heights, Ohio, assignor to General Electric Company, a corporation of New York Application January 14, 1943, Serial No. 472,397

15 Claims. (Cl. 49—2)

My invention relates, in general, to indexing machines of the type comprising a carrier provided with one or more rotatable work-supporting heads which are indexed to a plurality of work stations or positions by the carrier. More particularly, my invention relates to mechanism for controlling the operation of heads on machines of the indexing type.

Rotary indexing machines of the above-mentioned type are in general use in the manufacture of electric incandescent lamps, such as for sealing together certain of the glass lamp parts. Such a machine is shown, for example, in United States Patent No. 1,742,153, issued December 31, 1929, to W. H. Stiles et al. and disclosing a machine for butt-sealing miniature electric lamps.

One object of my invention is to provide an improved head rotating and positioning arrangement for a machine of the indexing type which is simple in construction and effective in operation.

Another object of my invention is to provide a machine of the indexing type having improved means for rotating the heads of such machine at certain of the work stations thereof, and for maintaining the heads locked in a definite angular position at the others of said work stations as well as during the index movement of the heads between the said other stations.

Still another object of my invention is to provide a head rotating and positioning arrangement for a machine of the indexing type which will provide positive control over the rotative movement of each head at all times during the course of its travel between, and its positioning at, the work stations of the machine.

A further object of my invention is to provide an improved head rotating mechanism for a machine of the indexing type which will impart a definite amount of rotational movement to each head when positioned at those stations where rotation of the head is to take place.

A still further object of my invention is to provide a machine of the indexing type having head rotating and carrier indexing mechanism so constructed and interrelated as to provide a relatively slow head rotation at those work stations where rotation of the head is to take place, coupled with a relatively high carrier index speed.

Another object of my invention is to provide a machine of the indexing type having a head rotating mechanism for rotating the heads at certain of the work stations of the machine, and for positively aligning those co-operating parts on the heads and machine base which serve to lock the heads in a definite rotative position during their indexing travel between, and while they are positioned at, the others of the said work stations of the machine.

Further objects and advantages of my invention will appear from the following description of a species thereof and from the accompanying drawings in which:

Fig. 1 is a plan view of the turret and underlying head rotating and head locking parts of a machine comprising my invention with the turret broken away to better show the said underlying parts and with the head rotating sector gear shown in its advanced position; Fig. 2 is a vertical section on the line 2—2 of Fig. 1; Fig. 3 is a vertical section on line 3—3 of Fig. 1 and showing, on an enlarged scale, the head positioned at station D of Fig. 1 with the head rotating sector gear shown in its retracted position; Fig. 4 is a fragmentary perspective view of the head rotating means comprising my invention, with the sector gear thereof shown in its retracted position and with only one head of the machine (i. e., the head at station D) shown in operative relation thereto; Fig. 5 is a fragmentary view, partly in plan and partly in section, on the line 5—5 of Fig. 3 and showing the head rotating and head locking means at station D with the sector gear of the head rotating means shown in its retracted position; and Fig. 6 is a vertical section on the line 6—6 of Fig. 3.

The machine shown in the accompanying drawings comprises a cam-operated oscillating sector gear for rotating the heads on the machine turret by the engagement of the sector gear with a pinion gear on each head spindle, the oscillating movement of the sector gear in one direction taking place while the turret is stationary so as to effect the rotation of the turret heads, while the movement of the sector gear in the opposite direction takes place in unison with the turret indexing movement so as to effectively lock the heads against rotation during such indexing movement. The machine further comprises a head-rotating sector gear having separable end sections which are movable relative to the main body portion of the sector gear in a direction longitudinally of the gear teeth thereon, the said gear end sections being moved into or out of meshing engagement with the pinion gear on the head spindle by the engagement of each gear end section with a stationary cam during the oscillating movement of the sector gear.

Referring to the drawings, the invention is there shown as applied to a machine for butt-sealing electric incandescent lamps, similar to the machine disclosed in the aforesaid United States Patent No. 1,742,153 to Stiles et al. The machine comprises a base or support stand 10 (Fig. 2) comprising a horizontal table 11 supported by, and fastened to, a pedestal 12. Disposed above the table 11 is a carrier or turret 13 which is carried by, and keyed to, a central hollow shaft 14 which extends through the table 11 into a chamber 15 formed by an enlarged housing portion 16 on the upper end of the pedestal 12. The shaft 14 surrounds, and is rotatably mounted on, an upstanding hollow support column 17 fixedly secured to the pedestal 12 and extending upwardly therefrom through the table 11 and the shaft 14. The weight of the turret 13 and its associated support shaft 14 is carried by a ball or roller bearing 18 which rests on the top of the pedestal 12, the lower end of the shaft 14 resting against the said bearing.

Mounted on the turret 13, at uniformly spaced points around the periphery thereof, are a plurality of heads 19 which are rotatably supported on the turret. Each head 19 carries means for receiving and supporting a bulb 20 and length of tubing 21 to be joined or sealed together. The heads 19 are successively indexed in a counterclockwise direction by the turret 13 to stations A to Q (Fig. 1), the turret and its support shaft 14 being rotated intermittently or indexed so as to cause each of the heads 19 to stop for definite periods at each of the said stations at which are located a series of means each of which has a definite function in producing the seal between the bulb 20 and the tube 21. Stations A to D inclusive are stations for loading each head 19 with a bulb 20, a mount 20' and a length of tubing 21, and for properly aligning the said parts in the head; stations E to N are sealing stations where the glass bulb 20 and tubing 21 are heated and eventually fused together; and stations O to Q are cooling and head unloading stations.

The counterclockwise indexing of the turret 13 is effected by a continuously rotating cam disc 22 keyed to a main drive shaft 23 mounted on the machine base 10 below the table portion 11 thereof. The said drive shaft 23 is rotated by a motor driven cross shaft 24 through a worm gear arrangement comprising a worm gear 25 on the drive shaft and a meshing worm 26 on the cross shaft. The said cross shaft 24 is driven by a motor (not shown) through suitable means, such as a chain and sprocket drive or a belt and pulley drive (not shown). Mounted on the cam disc 22 is a spirally grooved cam segment 27 of 90° arcuate extent which successively engages rollers 28 depending from the underside of a circular plate 29 which is disposed within the pedestal chamber 15 and is keyed to the turret drive shaft 14. The plate 29 is provided with a roller 28 for each head 19 of the turret, and the shape of the cam 22, 27 is such as to successively index the turret heads 19 from one station to another.

As shown in Fig. 3, each of the heads 19 comprises a vertical hollow sleeve 30 rotatably mounted in a bearing 31 on the turret 13. Fixedly secured to the upper end of the sleeve 30 is a disc or flange 32 having a depending hub portion 33 which rests against the upper end 34 of the turret bearing. At its lower end, the sleeve 30 is provided with a pinion gear 35. While the pinion gear 35 is preferably formed integral with the sleeve 30, as shown, it may, if desired, be formed separately therefrom and fixedly secured thereto in any suitable manner, as by set screws for instance. Mounted on the sleeve 30 immediately above the pinion gear 35 thereon is a head rotative positioning disc or shoe 36 provided with a flattened surface 37 for engagement with an arcuate shaped guide or shoe track 38 rigidly fastened to the upper surface of the machine table 11, as by a bracket 38'. The said disc or shoe 36 is secured to, and locked against rotation on the sleeve 30 by a pair of set screws 39 (Fig. 5) spaced 90° apart and screwed down against flats 40 on the sleeve. Mounted on the sleeve 30 and fitting snugly in the space between the lower end 41 of the turret bearing 31 and the upper surface 42 of the shoe 36, is a ball bearing 43. The sleeve 30 is thus locked against vertical movement in the turret bearing 31 by the engagement of the roller bearing 43 and the disc 32 with the opposite ends 41 and 34 of the turret bearing.

Extending through and slidably mounted in the sleeve 30 is a spindle or rod 44 having an enlarged hollow head portion 45 at its upper end to which a hollow bulb holder 46 is attached. The said bulb holder is provided with a cup-shaped seat 47 for the bulb 20, and the bulb is held in position in the holder by means of a vacuum which is supplied from a source (not shown) through a pipe 48 extending through the center support column 17 and connected, by connections 49, to a rotary control valve 50 located at the top of the support column 17. The vacuum is connected to each of the heads 19 from the rotary control valve 50 by means of connections or pipes 51 threaded into openings 52 in the turret bearings 31 which communicate with wells or enlarged bore portions 53 in the hollow interior of the turret bearings. The wells 53 communicate with vertically elongated slots 54 in the head sleeves 30 which slots in turn communicate with the hollow interior of the bulb holders 46 through connecting transverse and longitudinal bores 55 and 56, respectively, in the head spindle 44.

The lower end of the spindle 44 is provided with a washer-shaped shoe or disc 57 for engagement with an underlying circular cam track 58 fastened to the table 11. The spindle 44 and its bottom shoe 57 are constantly urged downwardly into engagement with the cam track 58 by a compression coil spring 59 fitting over the spindle and bearing at its upper end against the sleeve 30 and at its lower end against a shoulder 60 on the spindle.

The sleeve 30 and spindle 44 are locked against rotation relative to one another by a transversely extending pin 61 in the spindle the opposite ends of which pin extend into vertically elongated slots 62 in the inner wall or the sleeve. The pin 61 is free to slide in the slots 62 to thereby permit vertical movement of the spindle 44 relative to the sleeve 30, as effected by the cam track 58 during the course of travel of the heads 19 around the machine.

Each head 19 is provided with holding means for the length of tubing 21 to be sealed to the glass bulb 20, the said holding means comprising a pair of spring-closed jaws 63 pivotally mounted on an upstanding support post or rod 64 fastened to the disc portion 32 of the head. The jaws 63 are adapted to receive and hold the tube 21 in a vertical position in alignment with, and in relative close proximity to, the neck of the lamp bulb 20.

In the machine according to the invention, each head 19 remains stationary in its turret bearing 31 at all times during the operation of the machine except during the interval when it is positioned at certain of the work stations of the machine, at which stations it is given a definite amount of rotational movement. Thus, in the specific machine illustrated, each head 19 is rotated through approximately one and one-half turns while it is positioned at each of stations E to N inclusive, but is held against rotation at the other stations A to D and O to Q as well as during the index movement of the head between all of the stations.

In accordance with my invention, the means for rotating the heads 19 at stations E to N, inclusive, comprises an oscillating sector gear 65 rotatably mounted on the turret support shaft 14 between the turret 13 and the table 11 and supported by a ball bearing 66 resting on the table 11. The sector gear 65 engages the pinion gears 35 on the heads 19, when the latter are positioned at stations E to N inclusive, to thereby rotate the heads upon movement of the sector gear relative to the pinion gears. The sector gear 65 is of sufficient arcuate extent to engage the pinion gears 35 on successive heads 19 one more in number than the number of heads which are to be rotated at any given stationary position of the turret. Thus, in the particular machine shown employing sixteen heads of which nine successive ones are to be rotated for a given index position of the turret (i. e., the heads positioned at stations E to N inclusive), the sector gear 65 extends through ten successive heads including the nine which are to rotate. In other words, the sector gear 65 is slightly more than 202½ degrees in arcuate extent.

The oscillating movement of the sector gear 65 is produced by a rotating grooved disc cam 67 disposed immediately underneath the sector gear 65 between the said gear and the table 11. The said disc cam 67 is keyed to the upper end of a vertical shaft 68 which extends through, and is journaled in a bearing 69 in the table 11. The cam shaft 68 is driven by the main drive shaft 23 through a second vertical shaft 70 (Fig. 2) having a sprocket 71 which is connected by a chain 72 to a sprocket 73 on the lower end of the cam shaft 68, the said shaft 70 being driven by the main drive shaft 23 through a pair of intermeshing spiral gears 74, 75 and being journaled in bearings 76, 77 on the table 11 and machine stand 12.

The disc 67 is provided with a cam groove 78 in its upper surface into which fits a depending roller 79 on the sector gear 65. As the cam disc 67 rotates, the roller 79 rides in the cam groove 78 and imparts movement to the sector gear 65 as determined by the shape of the said cam, which shape is such as to continuously oscillate the sector gear 65 back and forth through an arc equal to the angular spacing (22½ degrees) of the turret heads 19, one revolution of the cam 67 producing one complete oscillation of the sector gear 65. In addition, the cam 67 is so shaped and timed with the index movement of the turret 13 as to "advance" the sector gear 65 (i. e., rotate it in a counterclockwise direction) in exact unison with the turret 13 during the index thereof, and then "return" the sector gear (i. e., rotate the said gear in a clockwise direction as viewed in plan) at a uniform rate of speed during the interval when the turret 13 is stationary.

The size or pitch diameters of the sector gear 65 and the co-operating pinion gears 35 on the heads 19 are selected so as to rotate each head only a slight amount, preferably through approximately one and one-half turns, for each return or head-rotating movement of the sector gear. Such a slight amount of head rotation thus enables the operation of the machine at relatively high index speeds, such as 2500 indexes or so per hour, without the head rotating at such a high speed as to create excessive centrifugal force tending to displace the lamp mount 20' relative to the bulb. Thus, in the machine according to the invention having an index speed as high as 2500 per hour and in which the period of each rest of the turret is three times as long as the time required for each index movement of the turret, the actual speed of rotation of a head 19 which rotates through a total of fourteen full turns at the nine head-rotating stations E to N, amounts to only 86½ R. P. M., or approximately 1.45 revolutions per second, which obviously is a relatively slow rotational speed.

In accordance with the invention, the sector gear 65 first engages the head pinion gears 35 during the index movements of the heads 19 to the first head rotating station E, and then finally disengages the head pinion gears during the index of the heads from the last head rotating station N. To enable the opposite ends of the sector gear 65 to engage and disengage the head pinion gears 35 during such index movements thereof, without stripping the gear teeth and without rotating the heads 19, the sector gear is provided with separable gear end segments or sections 80 and 81 which are vertically movable thereon into or out of engagement with the head pinion gears. The end segment 80 is located at the front end of the sector gear 65 (Fig. 1) and is moved upwardly into meshing engagement with the head pinion gears 35 during the index movement of each head 19 from stations D to E and the corresponding advance movement of the sector gear. Segment 81 is located at the back or rear end of the sector gear 65 and is moved downwardly out of meshing engagement with the head pinion gears 35 during the index of each head 19 from stations N to O and the corresponding advance movement of the sector gear.

As shown particularly in Fig. 3, the gear end segments 80 and 81 are slidably mounted each on a pair of vertical guide posts 82 depending from the main body portion of the sector gear and spaced apart radially of the sector gear. The gear end segments 80, 81 are of more or less inverted U-shape and have outer and inner depending legs 83 and 84, respectively, provided with guide openings 85 through which the guide posts 82 extend. At the outer end thereof, each gear end segment 80, 81 is provided with a radially outward extending tongue portion 86 terminating in gear teeth 87 which correspond to the gear teeth on the main body portion of the sector gear and form a continuation thereof when the gear end segment is in its uppermost, or pinion gear engaging position. The gear teeth 87 on the two gear end segments 80 and 81 are exact duplicates of one another, and the two segments 80, 81 are mounted on the sector gear proper so as to radially align with the heads 19 during the index of the heads from stations D to E and stations N to O.

The guide posts 82 are secured, as by set screws 82' (Fig. 6) to laterally extending lugs 88 on the sector gear 65. As shown in Fig. 6, the said lugs 88 are upwardly offset relative to the main body portion of the sector gear 65 so as to provide clearance for the gear end segments 80, 81 when they are raised to their uppermost positions.

The vertical movements of the gear end segments 80 and 81, as the sector gear 65 oscillates, are produced respectively by arcuate shaped cam blocks or plates 89 and 90 bolted or otherwise fixedly secured to the machine table 11 and provided with cam grooves 91 and 92, respectively, in each of which rides a roller 93 rotatably mounted on the corresponding gear end segment. The said cam blocks 89 and 90 are disposed between the depending legs 83, 84 of the corresponding gear end segments 80, 81 and the cam grooves 91, 92 in the said cam blocks are formed in the front or outer vertical faces 94 thereof while the rollers 93 are mounted on, and extend from the rear or inner side of, the outer legs 83 of the gear end segments.

The cam groove 91 in cam 89 is so shaped as to gradually raise the gear end segment 80, and slide the gear teeth 87 thereon into meshing engagement with the aligned gear teeth on the head pinion gears 35, during the index movement of each head 19 from stations D to E in unison with the advance or counterclockwise movement of the sector gear 65, the teeth on the segment and head pinion gears 80 and 35 first engaging one another when each head 19 has traveled only a relatively small portion of its total index distance from stations D to E.

The cam groove 92 in cam 90 is so shaped as to gradually lower the gear end segment 81, and slide the gear teeth 87 thereon out of meshing engagement with the teeth on the head pinion gears 35, during the index movement of each head 19 from stations N to O in unison with the advance or counterclockwise movement of the sector gear 65, the teeth on the segment and head pinion gears 81 and 35 finally disengaging from one another after each head has traveled a considerable portion of its total index distance from stations N to O.

The turret heads 19 are continuously locked against rotation, during the time the head pinion gears 35 are not in engagement with the sector gear 65, by the engagement of the shoe 36 on each head 19 with the arcuate guide or shoe track 38. As shown in Fig. 1, the said shoe track 38 extends from a point intermediate stations N and O, through stations P to D inclusive, to a point intermediate stations D and E. The front end 95 (Fig. 1) of the shoe track 38 extends forwardly of stations O (i. e., toward station N) a sufficient distance to insure the engagement of the said track by the shoe 36 on each head 19 before the gear end segment 81 at the rear end of the sector gear 65 becomes disengaged from the head pinion gear 35 during the index of the head from stations N to O. Likewise, the rear end 96 of the shoe track 38 projects beyond station D (i. e., toward station E) a sufficient distance to insure the engagement of the head pinion gear 35 with the gear end segment 80 at the front end of the sector gear 65 before the shoe 36 on the head rides off the rear end of the track 38 during the index of each head 19 from stations D to E. As a result, there is an overlap of the head rotational lock produced by the interengaged sector and head pinion gears 65 and 35, with the head rotational lock produced by the interengaged head shoes 36 and track 38, during the index of each head 19 from stations N to O and from stations D to E. The turret heads 19, therefore, are continuously locked in a definite rotative position, by the engagement of the head shoes 36 with the track 38, from a time just before the heads become disengaged from the sector gear 65 during their index movement from stations N to O until just after they re-engage the sector gear during their index movement from stations D to E.

Due to the rotative locking of the heads 19 by the engagement of the shoes 36 with the track 38, the pinion gear 35 on each head 19, as the head starts to index from stations D to E, will therefore be in exactly the same rotative position as it had when it was disengaged by the sector gear 65 during the course of the said head's index movement from stations N to O. Since the teeth 87 on the two gear end segments 80 and 81 are exactly alike and the two segments 80, 81 are radially aligned with the heads 19 during the index of the heads from stations N to O and D to E, the teeth 87 on gear end segment 80 will therefore be in exact intermeshing alignment with the teeth on the head pinion gears 35 during the index of each head 19 from stations D to E, as shown in Fig. 5. Consequently, when the gear end segment 80 is moved upwardly by cam 89, during the course of index of each head 19 from stations D to E, the teeth 87 on the said gear segment 80 will slide freely between, and mesh with, the teeth on the head pinion gear 35.

In order not to interfere with the oscillating movements of the sector gear 65, the opposite ends of the shoe track 38 are notched or recessed at the inner sides thereof, as indicated at 97 in Figs. 1 and 5, to thereby accommodate the outermost lugs 88 on the sector gear when the said gear is at the extreme limits of its oscillating movement.

The operation of the machine comprising my invention may be summarized as follows:

At stations A to D, each head 19 is loaded, either by hand or by automatic means (not shown) located at such stations, with a bulb 20, mount 20' and length of tubing 21, the head being locked against rotation at the said stations, as well as during its index movement therebetween by the engagement of the shoe 36 on the head sleeve 30 with the shoe track 38. During the interval when each head is positioned at station D, the disc cam 67 turns the sector gear 65 in a clockwise direction to its retracted or head "pick-up" position, the forward gear end segment 80 of the sector gear being lowered out of horizontal alignment with the head pinion gear 35 at station D by the action of the cam 89 on the said segment 80 during such retracting movement of the sector gear. The said retracting movement of the sector gear 65 meanwhile rotates all the head pinion gears 35, and therefore all the heads 19, with which the sector gear is engaged at stations E to N inclusive, each head being rotated through approximately one and one-half turns.

Just as soon as the sector gear 65 has reached its retracted position, the turret 13 starts to index, and the disc cam 67 then rotates the sector gear 65 in the opposite or counterclockwise direction in such a manner as to move as a unit with the turret. During this unitary advancing movement of the turret 13 and sector gear 65, the cam 89 raises the forward gear end segment 80 into meshing engagement with the pinion gear 35 on the head which is indexing from stations D to E, the said end segment initially engaging the head pinion gear before the shoe 36 on the head rides off the rear end 96 of the shoe track 38 so as to continuously maintain the rotative locking of the head during the entire index movement thereof from stations D to E.

As soon as the turret 13 completes its index movement, the sector gear 65 again changes its direction of movement and rotates clockwise once more, by the action of the disc cam 67 thereon, to its retracted position. This clockwise or return movement of the sector gear 65 then rotates the head 19 which has just been indexed to station E, as well as all the other heads 19 which have just been indexed to stations F to N inclusive.

From station E, where those portions of the bulb 20 and tube 21 which are to be sealed together are heated by gas flames from burners (not shown) located at the said station, the head 19 is then successively indexed by the turret 13 to stations F to N inclusive, at which stations the bulb 20 and tube 21 are further heated by gas flames from burners (not shown) located at such stations and the bulb and tube finally fused together. During the index of each head to each of stations F to N, the sector gear 65 rotates as a unit with the turret so as to effectively lock the head against rotation during such index movement. After each head reaches, and is positioned at each of the said stations F to N, the sector gear 65 then reverses its direction of rotation and returns to its retracted position, such return movement of the sector gear thus serving to rotate the head through approximately one and one-half turns at each of the said stations.

From the final head rotating station N, each head 19 is then successively indexed to stations O to Q where the heads remain stationary and the sealed bulb and tubing 20, 21 are allowed to cool down and are finally unloaded from the head either by hand or by automatic unloading mechanism (not shown) located at one of the said stations. At the start of the index movement of each head from station N to station O, the head is locked against rotation by the engagement of the head pinion gear 35 with the sector gear 65, the said sector gear rotating as a unit with the turret 13 so that there is no rotation of the sector gear relative to the head pinion gear such as to cause rotation of the said pinion gear. During the index movement of each head from stations N to O, however, the gear end segment 81 at the rear end of the sector gear 65 is lowered out of meshing engagement with the head pinion gear 35 by the action of the cam 90 on the said gear segment during the advancing movement of the sector gear in unison with the turret index movement. Also during the index of each head from stations N to O, the shoe 36 on the head sleeve 30 engages the shoe track 38 to thereby lock the head against rotation, the said shoe engaging the shoe track before the gear end segment 81 is actually disengaged from the head pinion gear 35 so as to continuously maintain the rotative locking of the head during the entire index movement thereof from stations N to O.

Inasmuch as each head 19 is rotated through a total of fourteen full turns from the time it arrives at the first head rotating station E until it leaves the last head rotating station N, each shoe 36 is herefore in the same rotative position, during the index thereof from stations N to O, as that which the said shoe had when it became disengaged from the rear end 96 of the shoe track 38 between stations D and E. As a result, the flat 37 of each shoe 36 is in proper inwardly facing position or alignment with the shoe track 38 for engagement therewith as the shoe and its associated head 19 are indexed from stations N to O. Following such reengagement of the shoe track 38 by the shoe 36 of each head between stations N to O, the head is then continuously locked against rotation by the interengaged shoe and shoe track from the time of such re-engagement until the point intermediate stations D and E where the shoe again rides off the rear end 96 of the shoe track.

Inasmuch as each head 19 is engaged either by the shoe track 38 or the sector gear 65 at all times during the course of its travel around the machine, the rotative position of the head is therefore under positive control at all times during such travel. In addition, each head is given the same amount of rotation at each of the head rotating stations E to N, as a result of which the bulb 20 and tubing 21 on successive heads are heated in exactly the same manner.

What I claim as new and desire to secure by Letters Patent of the United States is:

1. In a machine of the character described, the combination of a carrier having an article-supporting head rotatably mounted thereon, means for indexing said carrier to move said head to a plurality of work stations, and other means for rotating said head at at least one of said stations comprising a pinion gear on the head, a head-rotating gear arranged to mesh with said pinion gear during the index of the head to, and while it is positioned at, the said one station, and actuating means for oscillating said head-rotating gear to first advance it together with the carrier, and to then retract it while the said head is positioned at the said one station to thereby rotate the head.

2. In a machine of the character described, the combination of a carrier having a plurality of equally spaced article-supporting heads rotatably mounted thereon, means for indexing said carrier to move said heads to a plurality of work stations, and other means for rotating said heads at certain of said stations comprising a pinion gear on each of said heads, a head-rotating gear arranged to mesh with the said pinion gears during the index of the heads to the said certain stations and while they are positioned thereat, and actuating means for oscillating said head-rotating gear through a distance equal to the spacing of the heads to first advance it together with the carrier, and to then retract it while the carrier is stationary to thereby rotate the heads positioned at the said certain stations.

3. In a machine of the character described, the combination of a carrier having a plurality of article-supporting heads rotatably mounted thereon, means for indexing said carrier to move said heads to a plurality of work stations, means for locking said heads against rotation at certain successive ones of said stations and during the index of said heads to and away from the said certain stations, and means for rotating said heads at the others of said stations comprising a pinion gear on each of said heads, a head-rotating gear including a front section arranged to be moved so as to mesh with the said pinion gears at a time just prior to the release of the head by the said locking means and a rear section arranged to be moved so as to disengage the pinion gears at a time just after the relocking of the head by the said locking means, the intermediate portion of said head-rotating gear being in continuous engagement with the pinion gears contiguous thereto, and actuating means for oscillating said head-rotating gear to first advance it together with the carrier, and to then retract it while the carrier is stationary to thereby rotate all the heads positioned at the said other stations.

4. In a machine of the character described, the combination of a carrier having a plurality of article-supporting heads rotatably mounted thereon, means for indexing said carrier to move said heads to a plurality of work stations, means for locking said heads against rotation at certain successive ones of said stations and during the index of said heads to and away from the said certain stations, means for rotating said heads at the others of said stations comprising a pinion gear on each of said heads, a head-rotating gear arranged to mesh with the said pinion gears from a time just prior to the release of the head by the said locking means until a time just after the relocking of the head by the said locking means, and actuating means for oscillating said head-rotating gear to first advance it together with the carrier, and to then retract it while the carrier is stationary to thereby rotate all the heads positioned at the said other stations, said head-rotating gear comprising a main body portion and a separable gear end segment at each end thereof movable relative to the said main body portion, and cam means for moving said gear end segments into and out of meshing alignment with the said pinion gears during the oscillating movements of said head-rotating gear.

5. In a machine of the character described, the combination of a rotatable turret having a plurality of article-supporting heads rotatably mounted thereon, means for intermittently rotating said turret to thereby successively index said heads to a plurality of work stations, and other means for rotating said heads at certain of said stations comprising a pinion gear on each of said heads, a rotatable sector gear concentric with said turret and arranged to mesh with said pinion gears during the index of the heads to the said certain stations and while they are positioned thereat, and actuating means for rotating said sector gear first in one direction to advance it in unison with said turret, and then in an opposite direction while the turret is stationary to thereby rotate all the heads positioned at the said certain stations.

6. In a machine of the character described, the combination of a rotatable turret having a plurality of article supporting heads rotatably mounted thereon, means for intermittently rotating said turret to thereby successively index said heads to a plurality of work stations, means for locking said heads against rotation at certain successive ones of said stations and during the index of said heads to and away from the said certain stations, and means for rotating said heads at the others of said stations comprising a pinion gear on each of said heads, a rotatable sector gear concentric with said turret and arranged to mesh with said pinion gears from a time just prior to the release of the head by said locking means until a time just after the relocking of the head by said locking means, and actuating means for rotating said sector gear first in one direction to advance it in unison with said turret, and then in an opposite direction while the turret is stationary to thereby rotate the heads positioned at the said other stations, said sector gear comprising end portions movable into and out of engagement with the head pinion gears, and operating means for moving said end portions into and out of engagement with the said pinion gears during the rotating movements of said sector gear.

7. In a machine of the character described, the combination of a rotatable turret having a plurality of article-supporting heads rotatably mounted thereon, means for intermittently rotating said turret to thereby successively index said heads to a plurality of work stations, means for locking said heads against rotation at certain successive ones of said stations and during the index of said heads to and away from the said certain stations, and means for rotating said heads at the others of said stations comprising a pinion gear on each of said heads, a rotatable sector gear concentric with said turret and arranged to mesh with said pinion gears from a time just prior to the release of the head by said locking means until a time just after the relocking of the head by said locking means, and actuating means for rotating said sector gear first in one direction to advance it in unison with said turret, and then in an opposite direction while the turret is stationary to thereby rotate the heads positioned at the said other stations, said sector gear having end portions thereof movable into and out of meshing alignment with the head pinion gears during the rotating movements of said sector gear while the intermediate portion of said sector gear remains in meshing engagement with the head pinion gears during the rotating movements of said sector gear, and operating means for moving said gear end portions as aforesaid in proper time relation to the indexing motion of the turret.

8. In a machine of the character described, the combination of a rotatable turret having a plurality of article supporting heads rotatably mounted thereon, means for intermittently rotating said turret to thereby successively index said heads to a plurality of work stations, means for locking said heads against rotation at certain successive ones of said stations and during the index of said heads to and away from the said certain stations, means for rotating said heads at the others of said stations comprising a pinion gear on each of said heads, a rotatable sector gear concentric with said turret and arranged to mesh with said pinion gears from a time just prior to the release of the head by said locking means until a time just after the relocking of the head by said locking means, and actuating means for rotating said sector gear first in one direction to advance it in unison with said turret, and then in an opposite direction while the turret is stationary to thereby rotate the heads positioned at the said other stations, said sector gear comprising a main body portion and a separable end segment at each end thereof movable relative to the said main body portion, and cam means for moving said end segments into and out of meshing alignment with the said pinion gears during the rotating movements of said sector gear.

9. In a machine of the character described, the combination of a rotatable turret having a plurality of article supporting heads rotatably mounted thereon, means for intermittently rotating said turret to thereby successively index said heads to a plurality of work stations, means for locking said heads against rotation at certain successive ones of said stations and during the index of said heads to and away from the said certain stations, the head-locking means comprising a shoe on each of said heads and a stationary track for engagement with the shoes on said heads, and means for rotating said heads at the others of said stations comprising a pinion gear on each of said heads, a rotatable sector gear concentric with said turret and arranged to mesh with said pinion gears from a time just prior to the disengagement of said head-locking means until a time just after the re-engagement of said head-locking means, and actuating means for rotating said sector gear in timed relation with the turret to first advance the said sector gear in unison with the turret so as to lock the heads against rotation during the index of said turret, and to then retract the said sector gear while the turret is stationary to thereby rotate the heads positioned at the said other stations, said sector gear comprising end portions movable into and out of engagement with the head pinion gears, and operating means for moving said end portions into and out of engagement with the said pinion gears during the rotating movements of said sector gear.

10. In a machine of the character described, the combination of a rotatable turret having a plurality of article supporting heads rotatably mounted thereon, means for intermittently rotating said turret to thereby successively index said heads to a plurality of work stations, means for locking said heads against rotation at certain successive ones of said stations and during the index of said heads to and away from the said certain stations, the head-locking means comprising a shoe on each of said heads and a stationary track for engagement with the shoes on said heads, means for rotating said heads at the others of said stations comprising a pinion gear on each of said heads, a rotatable sector gear concentric with said turret and arranged to mesh with said pinion gears from a time just prior to the disengagement of said head-locking means until a time just after the reengagement of said head-locking means, and actuating means for rotating said sector gear in timed relation with the turret to first advance the said sector gear in unison with the turret so as to lock the heads against rotation during the index of said turret, and to then retract the said sector gear while the turret is stationary to thereby rotate the heads positioned at the said other stations, said sector gear comprising a main body portion and a separable end segment at each end thereof movable relative to the said main body portion, and cam means for moving said end segments into and out of meshing alignment with the said pinion gears during the rotating movements of said sector gear.

11. In a machine of the type comprising a rotatable turret having a plurality of work-supporting heads rotatably mounted thereon and means for intermittently rotating said turret to successively index said heads to a plurality of work stations, the combination therewith of means for rotating said heads at a series of successive ones of said stations, the head-rotating means comprising a pinion gear on each of said heads, a rotatable sector gear concentric with said turret and arranged to engage the pinion gears on said heads during their index to and away from the said series of head-rotating stations and while they are positioned thereat, and actuating means for rotating said sector gear in timed relation with said turret to first advance the said sector gear in unison with the turret so as to lock the gear-engaged heads against rotation during the index of the turret, and to then retract the said sector gear while the turret is stationary to thereby rotate the heads positioned at said head-rotating stations, said sector gear comprising separable end segments located at the front and rear ends of said sector gear, cam means co-operating with the front end segment to move said segment into engagement with the pinion gear on a head during the index of said head to the first head-rotating station, and other cam means co-operating with the rear end segment to move said rear segment out of engagement with the pinion gear on a head during the index of said head away from the last head-rotating station.

12. In a machine of the type comprising a movable carrier having a plurality of heads rotatably mounted thereon and means for intermittently indexing said carrier to carry the heads to a plurality of stations, a pinion gear carried by each of said heads, and means for rotating the heads at a series of successive stations comprising a gear member arranged to continuously engage the pinions on heads at the series of head-rotating stations, actuating means for oscillating said gear member to first advance it in unison with the carrier during the indexing motion and to then retract it while the carrier is at rest to thereby rotate the heads at said head-rotating stations, said gear member comprising sections at the front and rear ends thereof movable into and out of engagement with the pinions on certain heads without disengaging the remainder of the gear member from the pinions on heads at said head-rotating stations, and means for moving the front section of the gear member into engagement with the pinion on a head during the index of said head to the first head-rotating station while moving the rear section out of engagement with the pinion on a head during the index of said head away from the last head-rotating station.

13. In a machine of the type comprising a movable carrier having a plurality of equally spaced heads rotatably mounted thereon and means for intermittently indexing said carrier to carry the heads to a plurality of stations, a pinion gear carried by each of said heads, and means for rotating the heads at a series of successive stations comprising a gear member coextensive with the said successive stations and with an adjacent station and continuously engaging the pinions on heads at said successive stations, said gear member comprising end sections movable into and out of engagement with the pinions on heads at stations adjacent to said successive stations without disengaging the remainder of the gear member from the pinions on heads at the said successive stations, means for oscillating said gear member to first advance it in unison with the carrier during the indexing motion and to retract it while the carrier is at rest to thereby rotate the heads at the said successive stations, and means for moving the front and rear end sections of said gear member respectively into and out of engagement with the pinions on heads being indexed into and away from the said series of successive stations.

14. In a machine of the type comprising a rotatable turret having a plurality of work-supporting heads rotatably mounted at the periphery thereof and means for intermittently indexing said turret to carry the heads to a plurality of stations, a pinion gear carried by each of said heads, locking means engageable with the heads at a plurality of successive stations for locking said heads against rotation, and means for rotating the heads at the series of successive remaining stations comprising a sector gear coextensive with the said successive remaining stations and with an adjacent station and continuously engaging the pinion gears on the heads at said successive remaining stations, said sector gear having front and rear end sections vertically movable relative to the main sector, means for oscillating said sector gear to first advance it in unison with the turret during the indexing motion and to retract it while the turret is at rest to thereby rotate the heads at said remaining stations, and means for vertically moving said front and rear end sections of said sector gear during its advancing motion to carry said sections respectively into and out of engagement with the pinion gears on the heads being indexed away from the last non-rotating and the last rotating stations.

15. In a machine of the type comprising a movable carrier having thereon a plurality of rotatably mounted heads and means for intermittently indexing said carrier to carry the heads to a plurality of stations, a locking shoe and a pinion gear carried by each of said heads, a stationary track extending adjacent the path of travel of said heads in position to be engaged by the shoes thereon to lock the heads against rotation, the said track extending alongside a series of successive stations and projecting beyond the station at each end of the said series part of the distance toward the adjacent station, and means for rotating the heads located at the other stations comprising an oscillating gear member positioned to engage the head pinion gears, said gear member being of such length that when one end thereof is in engagement with the head at one end of said other stations the other end overlaps the adjacent end of the said track, means for advancing the gear member in unison with the indexing movement of the turret from an original position at which its front end overlaps the rear end of the track to a position at which its rear end overlaps the front end of the track and for then retracting the gear member to its original position while the carrier is at rest to thereby rotate the heads at the said other stations, the said gear member having its front and rear end portions constructed and arranged to be moved into and out of engagement with certain head pinion gears while its intermediate portion is in continuous engagement with the pinion gears on heads contiguous therewith, and means operable upon advancement of the gear member for moving said front end portion into engagement with the pinion on a head before said head leaves the rear end of said track while moving the rear end portion of the gear member out of engagement with the pinion gear on another head after said head engages the front end of said track.

FRED B. IDEN.